United States Patent
Breuer et al.

(10) Patent No.: US 12,495,394 B2
(45) Date of Patent: Dec. 9, 2025

(54) METHOD FOR INITIATING DATA TRANSMISSION FROM A USER EQUIPMENT

(71) Applicant: Telit Cinterion Deutschland GmbH, Munich (DE)

(72) Inventors: Volker Breuer, Botzow (DE); Rainer Dippel, Gemenos (DE)

(73) Assignee: Telit Cinterion Deutschland GmbH, Munich (DE)

(*) Notice: Subject to any disclaimer, the term of this patent is extended or adjusted under 35 U.S.C. 154(b) by 350 days.

(21) Appl. No.: 18/042,642

(22) PCT Filed: Aug. 24, 2021

(86) PCT No.: PCT/EP2021/073332
§ 371 (c)(1),
(2) Date: Feb. 23, 2023

(87) PCT Pub. No.: WO2022/043294
PCT Pub. Date: Mar. 3, 2022

(65) Prior Publication Data
US 2023/0337181 A1  Oct. 19, 2023

(30) Foreign Application Priority Data

Aug. 26, 2020  (EP) .................................... 20192939

(51) Int. Cl.
*H04W 68/02*  (2009.01)
*H04W 4/16*  (2009.01)

(52) U.S. Cl.
CPC ............. *H04W 68/02* (2013.01); *H04W 4/16* (2013.01)

(58) Field of Classification Search
CPC .................................. H04W 68/02; H04W 4/16
(Continued)

(56) References Cited

U.S. PATENT DOCUMENTS

| 2012/0302229 A1* | 11/2012 | Ronneke ................ H04W 4/70 |
| | | 455/422.1 |
| 2013/0155954 A1* | 6/2013 | Wang .................... H04W 76/27 |
| | | 370/328 |

(Continued)

FOREIGN PATENT DOCUMENTS

| EP | 3306959 | 4/2018 |
| KR | 1020100008233 A | 1/2010 |

(Continued)

OTHER PUBLICATIONS

International Search Report and Written Opinion for PCT Application No. PCT/EP2021/073332, mailed on Dec. 6, 2021.

(Continued)

*Primary Examiner* — Mark G. Pannell
(74) *Attorney, Agent, or Firm* — PEARL COHEN ZEDEK LATZER BARATZ LLP

(57) ABSTRACT

The present invention relates a user equipment UE registered for Non-IP communication services performs an application function. For providing application data via a radio access network, a method involves receiving a paging message and a subsequent radio link control, RLC, message in accordance with a Non-IP communication protocol. The paging message and the RLC message are initiated by an application server associated with the application function. The UE retrieves a network address of the application server in accordance with an IP communication protocol stack, and activates use of the IP communication protocol stack. The UE then requests IP communication services from the core network via the wireless cellular network, obtains a dynamic network address in accordance with the Internet Protocol and uses its dynamic network address and the network address of the application server to providing the application
(Continued)

data to the application server using the IP communication services via the wireless cellular network.

14 Claims, 4 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0092554 A1* | 4/2015 | Mochizuki | H04W 88/06 370/252 |
| 2018/0139651 A1 | 5/2018 | Kim et al. | |
| 2018/0220256 A1 | 8/2018 | Kotecha et al. | |
| 2019/0200178 A1 | 6/2019 | Sudarsan et al. | |
| 2019/0253870 A1 | 8/2019 | Ronneke et al. | |
| 2020/0037226 A1 | 1/2020 | Magadevan | |
| 2020/0120475 A1 | 4/2020 | Gupta | |

FOREIGN PATENT DOCUMENTS

| | | | |
|---|---|---|---|
| KR | 1020130110197 A | 10/2013 | |
| KR | 1020130113490 A | 10/2013 | |

OTHER PUBLICATIONS

3rd Generation Partnership Project; Technical Specification Group Services and System Aspects; Architecture enhancements to facilitate communications with packet data networks and applications (Release 16), Jul. 9, 2020, pp. 1-134, XP051924389.

ZTE: "Device Triggering for offline MTC device", 3GPP Draft; S2-112330, 3rd Generation Partnership Project (3GPP), Mobile Competence Centre ; 650, Route Des Lucioles ; F-06921 Sophia-Antipolis Cedex ; France, vol. SA WG2, No. Xi'An; May 16, 2011, May 11, 2011, XP050525351.

Huawei et al. "MTC Device Bearer Level Trigger" 3GPP Draft: S2-114189, 3rd Generation Partnership Project (3GPP), Mobile Competence Center: 650, Route Des Lucioles: F-06921 Sophia-Antipolis Cedex; France, vol. SA WG2, No. Jeju Island: Oct. 4, 2011, XP050549372.

SA WG2 Meeting #110-AH S2-152902, Ericsson, Huawei, S2-152902 "Protocol at SGi for non-IP case/Support for small data transmission without UDP/IP header", Sep. 3, 2015.

ZTE Communications Technology, vol. 23, No. 01, Zhang Wanchun, Lu Ting, and Gao Yin, "NB-IoT, System Status and Development of NB-IoT", Dec. 29, 2016.

* cited by examiner

METHOD FOR INITIATING DATA TRANSMISSION FROM A USER EQUIPMENT

CROSS-REFERENCE TO RELATED APPLICATIONS

This application is a National Phase Application of PCT International Application No. PCT/EP2021/073332, International Filing Date Aug. 24, 2021, claiming the benefit of European Patent Application No. 20192939.5, filed Aug. 26, 2020, which are hereby incorporated by reference in their entirety.

FIELD OF THE INVENTION

The present invention is related to a method for operating a user equipment that is registered with a core network for Non-IP communication services via a wireless cellular radio access network in performing an application function and providing application data via the wireless cellular radio access network. It is also related to a method for operating an application server in retrieving application data from a user equipment that is registered with a core network for Non-IP communication services via a wireless cellular radio access network. It is further related to a user equipment for performing an application function and providing application data via a wireless cellular radio access network, an application server for retrieving application data from a user equipment via a wireless cellular radio access network, and to an arrangement for generating and retrieving application data from a user equipment that is registered with a core network for Non-IP communication services via a wireless cellular radio access network. The invention is finally also related to computer programs comprising executable code instructing a programmable processor of a computer to perform a given one of the mentioned methods.

BACKGROUND OF THE INVENTION

In many machine-to-machine communication applications, a user equipment (UE) has to regularly transmit data to one or more distant application servers via a cellular wireless access network.

As an example, a meter device for electrical energy consumption transmits consumption data associated with a respective user of the meters device to an application server. This allows invoicing for the electrical energy provided without having to rely on a service person or the customer performing the reading. Such consumption data transmissions are done on request by the application server through the network of a Mobile Network Operator (MNO).

A first alternative known solution involves restricting the connectivity options of a user equipment to the use of a fixed (static) IP address. The meter device can then be operated in a listener mode and the application server can take data on demand.

However, for using a fixed IP address of the metering device, the customer is typically charged with extra fees by his or her mobile network operator (MNO). Furthermore, if a connection cannot be established for some reason, the application server cannot inform the meter device to initiate the connection. To cope with this problem, it is known to periodically let the meter device establish a connection with the application server. However, establishing a connection periodically by an application installed in the meter device, and not on demand from the server, is not desired because such periodic connections generate potentially useless and therefore undesired data traffic.

Furthermore, in metering applications, it is often not known in advance when the meter device is to be read out. For instance, events such as user changes due to changes in ownership or renting status cannot be tied to a periodic schedule and are not predictable. On the other hand, reading out periodically with a frequency high enough to cover any event, such as daily or weekly, causes extra costs for the user and for the service provider.

A second alternative known solution involves the use of dynamic IP addresses on the side of the user equipment. However, it is generally not possible for an application server to ascertain a dynamic IP address of a user equipment for requesting initiation of a data transfer from the user equipment to the application server. Currently, therefore, if a user equipment has a dynamic IP address and the application server wants to request a data transmission, the application server sends a text message (widely also referred to as SMS, "short message service") to the user equipment as a trigger. In response to receiving the SMS, the UE connects to the application server using its dynamic IP address and transfers the consumption data.

However, the capability and availability of SMS is not ubiquitous. For instance, in 5G networks implementing a narrow-band Internet of things (NB-IoT) communication standard, there is no SMS capability. NB-IoT communication is a Low Power Wide Area Network (LPWAN) radio technology standard that was standardized to enable a wide range of machine-to machine (M2M) services using cellular wireless communication networks. NB-IoT uses a subset of the LTE (4G) standard, but limits the bandwidth to a single narrow band of 200 kHz. It uses OFDM modulation for downlink communication and SC-FDMA for uplink communication. NB-IoT is therefore especially suited for a low-end M2M market, including the above example of networked meter devices. Thus, the described solution for requesting a transmission of data from the UE to the application server using an SMS trigger is not available in a 5G NB-IoT network, which is otherwise especially suited for use by M2M applications, including e-metering.

SMS may also be unavailable temporarily even if a network generally provides this service.

SUMMARY OF THE INVENTION

It would thus be desirable to enable a server-initiated data transmission from a user equipment which employs a dynamic IP address to an application server, if or when an SMS-based triggering of the data transmission is not available.

The present invention encompasses several aspects, as outlined in the following. In a first aspect, the present invention is related to a method for operating a user equipment that is registered with a core network for Non-IP communication services via a wireless cellular radio access network in performing an application function and providing application data via the wireless cellular radio access network. According to a second aspect, it is also related to a method for operating an application server in retrieving application data from a user equipment that is registered with a core network for Non-IP communication services via a wireless cellular radio access network. According to a third aspect, it is further related to a user equipment for performing an application function and providing application data via a wireless cellular radio access network. In a fourth aspect, it is related to an application server for retrieving application data from a user equipment via a wireless cellular radio access network. According to a fifth aspect, it is related to an arrangement for generating and retrieving application data from a user equipment that is registered with a core network for Non-IP communication services via a wireless cellular radio access network. In a sixth and seventh aspect, the invention is finally also related to computer programs comprising executable code instructing a programmable processor of a computer to perform a given one of the mentioned methods.

The following turns to a more detailed description of the different aspects of the present invention.

According to a first aspect of the present invention, a method is provided for operating a user equipment that is registered with a core network for Non-IP communication services via a wireless cellular radio access network in performing an application function and providing application data via the wireless cellular radio access network. The method comprises generating application data while performing an application function;

receiving a paging message and a subsequent radio link control, RLC, message in accordance with the Non-IP communication protocol stack, the paging message and the RLC message being initiated by an application server associated with the application function;

retrieving from the RLC message a request for transmission of the application data from the user equipment to the application server using IP communication services via the wireless cellular network;

retrieving from the RLC message a network address of the application server in accordance with the Internet Protocol on the network protocol layer of an IP communication protocol stack to be used for the IP communication services;

activating use of the IP communication protocol stack;

requesting IP communication services from the core network via the wireless cellular radio access network;

obtaining from the core network a dynamic network address of the user equipment that is in accordance with the Internet Protocol on the network protocol layer of the IP communication protocol stack; and using the ascertained dynamic network address of the user equipment and the network address of the application server, providing the application data to the application server using the IP communication services via the wireless cellular radio access network.

The method of the first aspect proposes a solution for enabling a server-initiated transmission of application data from the user equipment to an application server via IP communication services that is viable in absence of SMS capability. In particular, it is suited for use in performing a server-initiated data transmission via a 5G NB IoT network from a user equipment that uses a dynamic network address such as a dynamic IP address to receive and provide data, using an IP communication protocol stack. The method involves originally operating the user equipment using Non-IP communication services via a wireless cellular radio access network. This enables a server-initiated triggering of the data transmission using a paging followed by an RLC message providing the destination network address of the application server for the data transmission requested from the user equipment.

Upon receiving the paging and the associated RLC message, the user equipment then switches from using Non-IP communication services to using IP communication services by internally activating use of an IP communication protocol stack and performing suitable control communication with the core network via the wireless cellular network to obtain a dynamic network address under the Internet Protocol. Using this dynamic network address, or in short dynamic IP address, the user equipment subsequently establishes a requested transfer of application data to the application server via the wireless cellular radio access network.

The method of the invention thus provides an asynchronous type of non-IP/IP communication that enables instant transmission of the application data terminating at the application server provided as the destination address of the data transfer. While the method is particularly suited for use under a 5G NB IoT communication standard, it is not restricted to such embodiments. It generally allows server-initiated data transfers from a user equipment without having to rely on SMS. It can thus be used under other communication standards, for instance in situations where an SMS-based trigger mechanism is not available or not successful.

The method of the invention enhances operation of a user equipment that is registered as a non-IP device. While registered for non-IP-communication service, the user equipment can regularly or periodically operate as a non-IP device, for instance use a service-control-exposure-function (SCEF) to transfer its data. However, upon receiving the paging message and the subsequent RLC message with a suitable payload, as initiated by the application server, the user equipment opens an IP tunnel to the network address indicated by the payload. So the user equipment performs asymmetric traffic, that is, non-IP traffic in the downlink direction and IP traffic in the uplink direction. This has the advantage that the uplink traffic is not terminated in the domain of the radio network operator, but directly at the application server, which in many application cases is also the owner of the user equipment providing the application data. Furthermore the non-IP downlink triggering on demand without using SMS allows the user equipment to be operated at very low cost, for instance in a NB IoT network. The cost is also kept low by the transmission of the application data without a fixed network address of the user equipment and by avoiding the need to perform regular traffic just to avoid losing an IP-based connection to the application server.

In the following, embodiments of the method will be described.

In some embodiments, in order to register with the core network for Non-IP communication services via the wireless cellular radio access network in performing the application function, the method additionally comprises, at any time before receiving the paging message, activating use of a Non-IP communication protocol stack for Non-IP communication services that exclude using an Internet Protocol on a network protocol layer; and registering with a core network for Non-IP communication services via a wireless cellular radio access network.

These steps are preferably also performed after providing the application data to the application server using the IP communication services via the wireless cellular network, in order to return back to the non-IP operation performed before the data transfer. The user equipment uses an IP protocol stack by opening a radio connection requesting an IP connection indicated by PDN type IP. Alternatively, requesting a non-IP connection typically involves sending a communication request containing a PDN Type "Non-IP". This PDN type is in some embodiments used for non-IP data delivery (NIDD) over an SCEF.

Preferably, registering with the core network for Non-IP communication services via the wireless cellular radio access network comprises
> providing to the core network a packet-data-network, hereinafter PDN, connectivity request specifying a PDN type as Non-IP.

Thus, requesting a non-IP connection for data delivery is performed by sending a communication request containing a PDN type "Non-IP", which is used for Non-IP data delivery (NIDD) over a service-control-exposure-function SCEF.

In another embodiment, requesting from the network IP communication services via the wireless cellular network comprises
> using the IP communication protocol stack, opening a connection to a core-network access node responsible for mobility management for the user equipment, and requesting provision of bearer information for uplink IP communication services from the user equipment via the wireless cellular network, and requesting provision of the dynamic network address;
> receiving the bearer information and the dynamic network address from the core-network access node via the wireless cellular network.

The user equipment for instance uses the IP protocol stack by opening a radio connection requesting an IP connection indicated by a PDN type "IP". The user equipment thus switches its communication mode and protocols to an IP mode, opens a connection to a mobility management server in the core network, such as an Mobility Management Entity (MME), requesting for a PDO-context to get assigned a dynamic network address and uses the received network address of the application server for tunneling the application data through the operator network.

After receiving the bearer information, providing the application data to the application server suitably comprises in some embodiments
> using a bearer indicated by bearer information, the network address of the application server as a destination address, and using the dynamic network address of the user equipment as a source address in sending the application data to the application server via the wireless cellular network and via an assigned core-network serving gateway node.

In some embodiments, the destination address conveyed to the UE in the RCL message is the IP-address of the application server that initiates the paging message. However, the term "application server" used herein also encompasses embodiments with distributed application-server functionality. The network address of the application server that is to receive the data transmission thus need to be that of the application server requesting the data transmission. More specifically, in some embodiments, a first application server node under the control of the operator of the application associated with the application function performed by the user equipment triggers the paging of the user equipment, and the conveyed network address of the application server to be used for the data transmission of the application data by the user equipment is that of a second application server node.

In situations where the user equipment already has a dynamic IP address from a recent PDP activation, the control communication with the wireless cellular network in response to receiving the paging message can be reduced.

Other embodiments further comprise, upon receiving the RLC message following the paging message from the application server, retrieving from the RLC message a challenge according to a challenge-response protocol. Here, providing the application data to the application server comprises providing a predetermined valid response according to the challenge-response protocol.

According to a second aspect of the present invention, a method is provided for operating an application server in retrieving application data from a user equipment that is registered with a core network for Non-IP communication services via a wireless cellular radio access network. The method is defined in claim 6.

The method of the second aspect comprises
> sending to a core-network node a paging instruction initiating the core-network node to control provision of a paging message in accordance with a Non-IP communication stack that excludes using an Internet Protocol on a network protocol layer for the Non-IP communication services, for paging a selected user equipment via a wireless cellular radio access network, and to control provision of an RLC message following the paging message including, for forwarding to the user equipment in the RLC message following the paging message:
>> a request for transmission of application data from the user equipment to the application server using an IP communication service between the user equipment and the application server via the wireless cellular radio access network and a dynamic network address of the user equipment to be ascertained by the user equipment, and
>> a network address of the application server in accordance with the Internet Protocol on the network protocol layer of an IP communication protocol stack to be used for the IP communication service;
> using the IP communication services, receiving the requested application data from the user equipment via the wireless cellular radio access network.

The method of the second aspect represents the operation of the application server in communication with one or more user equipment devices, which are operated in accordance with the method of the first aspect of the invention in performing the communication of application data. Therefore, the method of the second aspect shares the advantages of the method of the first aspect.

In particular, it allows an application server initiating a data transfer from a user equipment without having to rely on a fixed network address, in particular a fixed IP address, of the user equipment for performing the application-data transfer. Even though the user equipment is operated as a non-IP device and in absence of SMS capabilities, the method achieves triggering the user equipment for the transfer of application data. It enables the application server to initiate an instant transmission of application data terminating at the application server, which is provided as the destination address of the data transfer in the RLC message. The method is particularly suited, but not intended as being restricted for use under a 5G NB IoT communication standard.

In the following, embodiments of the method of the second aspect will be described.

In one embodiment, sending the paging message to the user equipment comprises
> providing, using an application program interface protocol, a paging initiation instruction to a core-network service-control-exposure-function, hereinafter SCEF, node, the paging initiation instruction instructing the core-network SCEF node to initiate provision of the paging message to the user equipment via a Non-IP data delivery using the Non-IP communication protocol stack via the wireless cellular radio access network.

In a variant of this embodiment, providing the paging initiation instruction to the core-network SCEF node comprises ascertaining that the core network does not support short message services (SMS);

providing a paging SMS message to a SMS gateway-replacer node, wherein the paging SMS message is an SMS message comprising an instruction for the SMS gateway-replacer node to generate and provide the paging initiation instruction to the SCEF node.

This variant introduces a new network node functionality, the SMS gateway-replacer node. This allows an application server that has been operating with "SMS trigger" in the form of a paging SMS message to continue using this known trigger method. The new server function thus operates based on legacy customer application-server functionality and replaces SMS request by triggering non-IP paging (MS-ISDN) in downlink and hence does not require any change when going towards NB-Iot without SMS functionality.

In response to detecting that the core network does not support SMS, the application server redirects paging SMS message to the SMS gateway-replacer node. The SMS gateway-replacer node receives the paging SMS message and performs the contacting, in response to receiving the paging SMS message, of the respective user equipment by starting an asynchronous communication.

In a variant for mixed deployments, in which some user equipments are registered with legacy networks that do support SMS and other user equipments are registered with networks that do not support SMS, the SMS gateway-replacer node addresses the "legacy devices" via SMS.

We claim for operating an SMS gateway-replacer, i.e. a
1. For the legacy installed base normal SMS procedure will be triggered.
2. For NB-IoT devices not supporting SMS the non-IP downlink will be selected. UL is always received directly by IP in same way.

In another embodiment that involves an SMS gateway-replacer node, sending the paging message to the user equipment comprises ascertaining that the core network does not support SMS;

providing a paging SMS message to a SMS gateway-replacer node, wherein the paging SMS message is an SMS message comprising an instruction for the SMS gateway-replacer node to generate and provide a paging initiation request to a core-network serving gateway support, hereinafter SGSN node, the paging initiation request instructing the core-network SGSN node to initiate provision of the paging message to the user equipment via a Non-IP data delivery using the Non-IP communication protocol stack via the wireless cellular radio access network.

According to a third aspect of the present invention, a user equipment for performing an application function and providing application data via a wireless cellular radio access network is provided in accordance with claim 10. The user equipment comprises:

an application unit configured to generate application data while performing an application function;

a communication control unit, which is configured
to activate use of a Non-IP communication protocol stack that excludes using an Internet Protocol on a network protocol layer for the Non-IP communication services;

to control operation of the user equipment in registering with a core network for only Non-IP communication services via a wireless cellular radio access network;

upon receiving a paging message and a subsequent RLC message in accordance with the Non-IP communication protocol stack, the paging message being initiated by an application server associated with the application function, to retrieve from the RLC message a request for transmission of the application data from the user equipment to the application server using IP communication services via the wireless cellular network; and to retrieve from the RLC message a network address of the application server in accordance with the Internet Protocol on the network protocol layer of an IP communication protocol stack to be used for the IP communication services;

to activate use of the IP communication protocol stack;

to control operation of the user equipment in requesting IP communication services from the core network via the wireless cellular network and obtaining from the core network a dynamic network address of the user equipment that is in accordance with the Internet Protocol on the network protocol layer of the IP communication protocol stack; and to control operation of the user equipment in providing the application data to the application server using the IP communication services via the wireless cellular network and the ascertained dynamic network address of the user equipment and the network address of the application server.

The user equipment of the third aspect is configured to perform the method of the first aspect and thus shares its advantages. Embodiments of the user equipment are configured to perform a respective one of the embodiments of the method of the first aspect, as described hereinabove.

According to a fourth aspect of the present invention, application server for retrieving application data from a user equipment via a wireless cellular radio access network is provided in accordance with claim 11.

The application server comprises
a server control unit that is configured
to control operation of the server in generating and sending to a core-network node a paging instruction instructing the core-network node to initiate provision of a paging message and a subsequent RLC message in accordance with a Non-IP communication stack that excludes using an Internet Protocol on a network protocol layer for the Non-IP communication services, to a selected user equipment via a wireless cellular radio access network, the paging instruction including, for forwarding to the user equipment in the RLC message, a request for transmission of application data from the user equipment to the application server using an IP communication service between the user equipment and the application server via the wireless cellular radio access network and a dynamic network address of the user equipment to be ascertained by the user equipment, and a network address of the application server in accordance with the Internet Protocol on the network protocol layer of an IP communication protocol stack to be used for the IP communication service;

to control operation of the server in receiving, using the IP communication services, the requested application data from the user equipment via the wireless cellular radio access network.

The application server of the fourth aspect is configured to perform the method of the second aspect and thus shares its advantages. Embodiments of the application server are configured to perform a respective one of the embodiments of the method of the second aspect, as described hereinabove.

According to a fifth aspect of the present invention, an arrangement for generating and retrieving application data from a user equipment via a wireless cellular radio access network in accordance with claim 12 is provided. The arrangement comprises a user equipment according to the third aspect or one of its embodiments, and an application server according to the fourth aspect or one of its embodiments.

A particular embodiment of the arrangement of the fifth aspect further comprises an SMS gateway-replacer node; wherein the application server is configured to ascertain that the core network does not support short message services, hereinafter SMS; and to provide a paging SMS message to the SMS gateway-replacer node; and wherein the SMS gateway-replacer node is configured, upon receiving the paging SMS message, to generate and provide, using an application program interface protocol, a paging initiation instruction to a core-network service-control-exposure-function, hereinafter SCEF, node, the paging initiation instruction instructing the core-network SCEF node to initiate provision of the paging message to the user equipment via a Non-IP data delivery using the Non-IP communication protocol stack via the wireless cellular radio access network.

As an alternative thereto, another embodiment of the arrangement further comprises an SMS gateway-replacer node; wherein the application server is configured to ascertain that the core network does not support short message services, hereinafter SMS; and to provide a paging SMS message to the SMS gateway-replacer node; and wherein the SMS gateway-replacer node is configured, upon receiving the paging SMS message, to generate and provide a paging initiation request to a core-network serving gateway support, hereinafter SGSN node, the paging initiation request instructing the core-network SGSN node to initiate provision of the paging message to the user equipment via a Non-IP data delivery using the Non-IP communication protocol stack via the wireless cellular radio access network.

A sixth aspect of the present invention is formed by a computer program comprising executable code instructing a programmable processor of a computer to perform a method according to the first aspect or one of its embodiments. A seventh aspect is formed by a computer program comprising executable code instructing a programmable processor of a computer to perform a method according to the second aspect or one of its embodiments.

BRIEF DESCRIPTION OF THE DRAWINGS

The following turns to a description of the attached drawings. In the drawings.

Figure 1:
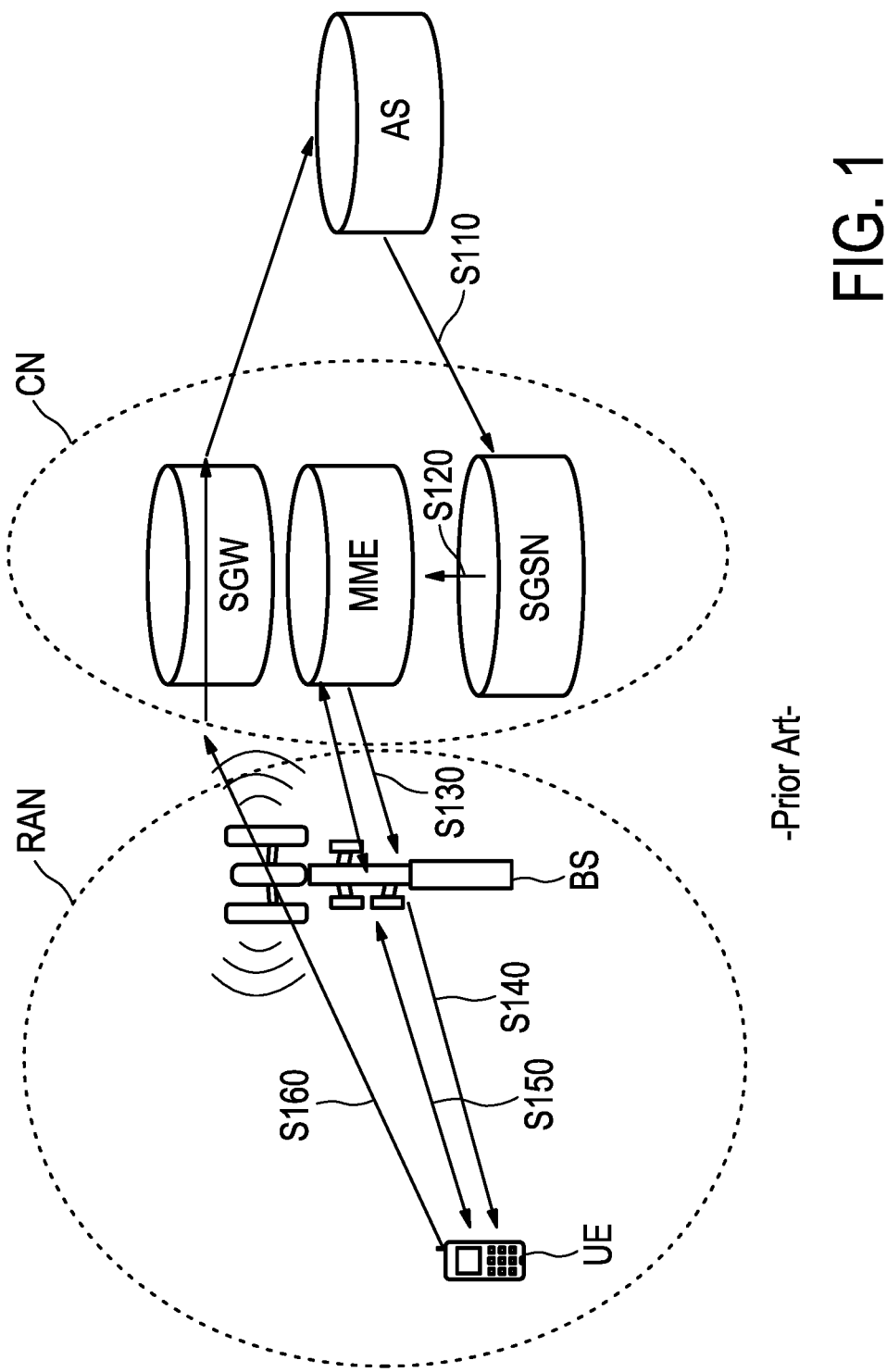
FIG. 1 is an illustration of a prior-art method for a server-initiated provision of application data from a user equipment to an application server via a wireless cellular radio access network.

An application server AS is operated to initiate a transmission of application data from one or more user equipment devices UE to the application server AS. The user equipment UE is operated as an application device in a wireless cellular radio access network RAN for non-IP communication services. It is registered with a core network CN. To retrieve application data collected by the user equipment UE, the application server AS contacts the user equipment UE by sending an SMS to a serving gateway support node SGSN in the core network, in a step S110. The SMS contains payload data instructing the user equipment UE to transmit collected application data, and providing a an IP address of the application server as the destination network address of the data transmission. As is known, to deliver the SMS, the serving gateway support node SGSN forwards the SMS to a mobility management entity MME (step S120), which ascertains the eNodeB, herein called base station, BS of the radio access network RAN in which the user equipment UE is operated and forwards the SMS to the base station BS in step S130 so that the SMS finally is delivered to the user equipment UE via the base station BS in step S140. Upon reception of the SMS, the user equipment UE requests IP communication services from the core network CN via a via packet-data-protocol (PDP-) connection request in a control exchange with the mobility management entity MME, in a step S150. After receiving a dynamic IP address, the user equipment starts transferring application data to the application server AS via the base station BS and a serving gateway server SGW in the core network CN, in a step S160. The application data is terminated in the application server, i.e., no further interaction with a mobile network operator (MNO) is required for the uplink.

Since the user equipment only operates with a dynamic IP address whenever it uses IP communication services, the described process relies on the availability of SMS to allow the application server AS triggering the user equipment UE. Thus, the described process cannot be used when a network does not provide SMS capability, be it temporarily or permanently. The latter applies for networks complying with the 5G NB-IoT communication standard.

The process of the invention is based on the following considerations and recognitions. For enabling a server-initiated data transmission from a user equipment to the application server AS in absence of SMS capability, but with the user equipment using UE a dynamic IP address, one technical solution could be to require the user equipment UE to continuously maintain a data connection between the user equipment and the application server. However, this would increase data traffic and thus potentially create cost but no gain in service for the operator of the user equipment UE. Furthermore, this solution would be unlikely to find acceptance with operators of user equipment devices who prefer sending data under their own control.

On the other hand, as mentioned before, using a fixed IP address creates higher cost, which is charged by the mobile network operator (MNO). Only intermittently letting the user equipment establish a connection with the application server is not desired because such connections generate potentially useless and therefore undesired data traffic in case no application data is to be transferred. The transmission of the application data should thus be on demand by the application server only, and the point in time for the transmission equally under the control of the application server.

Figure 2:
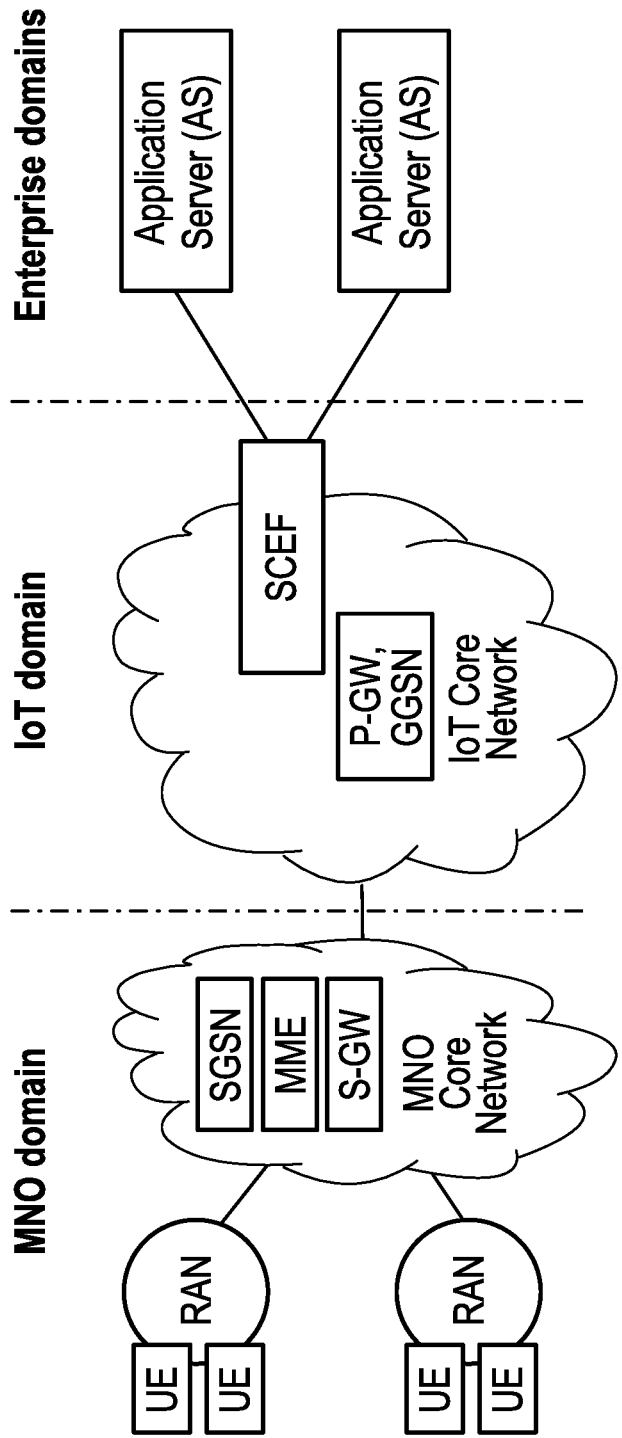
FIG. 2 is a schematic illustration of an IoT network architecture.

FIG. 2 is a schematic illustration of an exemplary IoT network architecture suitable for use of the present invention. The network architecture is per se known. User equipment devices UE, radio access networks RAN and a core network are operated by a mobile network operator (MNO) in a MNO domain. From the core network nodes in the MNO domain, only a mobility management entity MME, a serving gateway support node SGSN and a serving gateway SGW are shown. This core network nodes are generally known and therefore need no further explanation. An IoT core network forms an IoT domain as a part of the core network. The IoT core network is typically operated either by a mobile virtual network operator (MVNO) or by the MNO itself. From the network nodes in the IoT domain, a packet data network gateway P-GW and a Gateway GRPRS support node GGSN are shown. A service-control-exposure-function or SCEF serves to operate application programming interfaces to application servers (AS) in enterprise domains. The SCEF may reside at the edge of the IoT domain as shown in FIG. 2. Alternatively, the SCEF may lie completely within the IoT domain, interfacing with an external API Management platform at the edge of the IoT domain.

Figure 3:
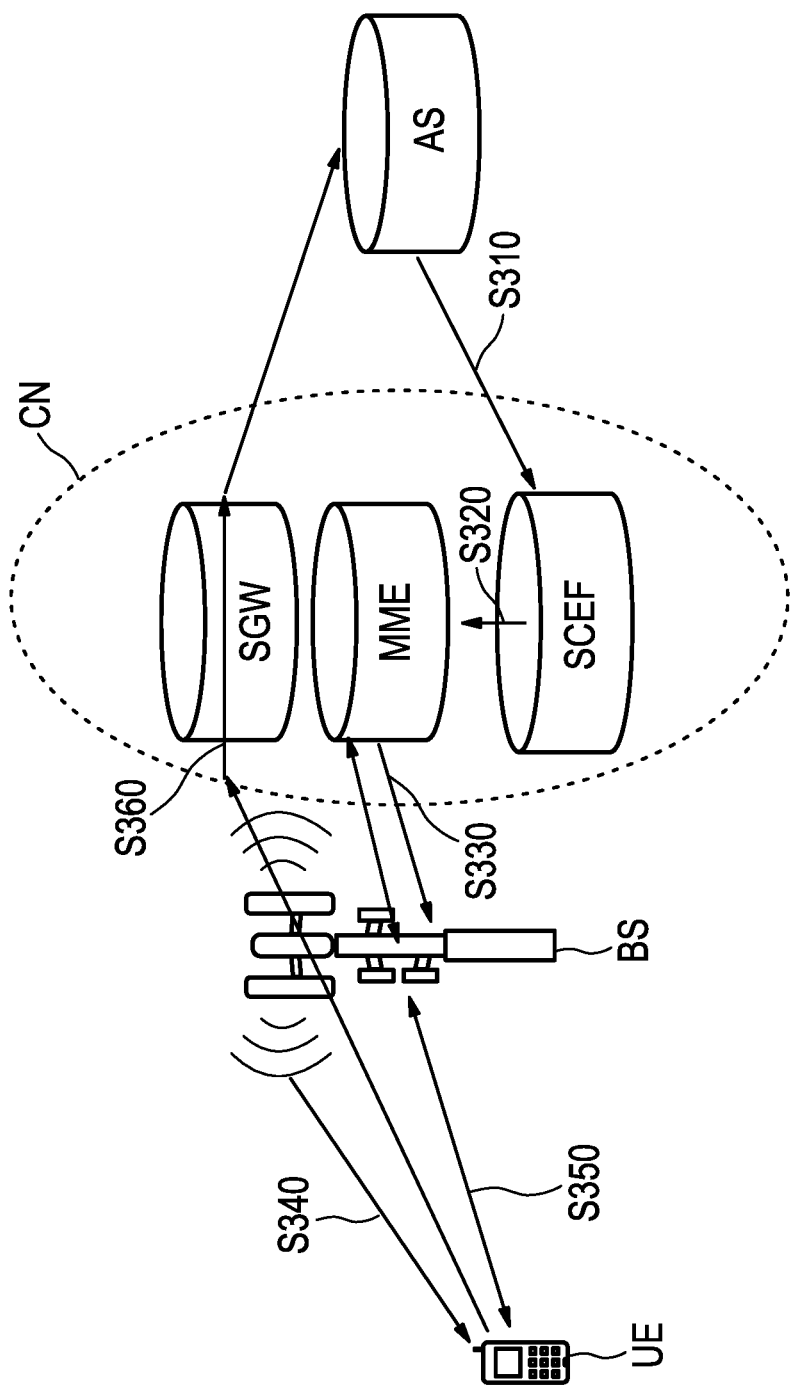
FIG. 3 is an illustration of first embodiment of a method for a server-initiated provision of application data from a user equipment to an application server via a wireless cellular radio access network according to the present invention.

FIG. 3 is an illustration of first embodiment of a method according to the present invention for a server-initiated provision of application data from a user equipment to an application server via a wireless cellular radio access network. The embodiment illustrates at the same time a method for operating an application server in retrieving application data from a user equipment that is registered with a core network for Non-IP communication services via a wireless cellular radio access network. The network structure indicated in FIG. 3 is only schematic, as in FIG. 1. The network structure explained in more detail in the context of FIG. 2 is suitable for carrying out the present embodiment.

According to the method shown in FIG. 3, a user equipment UE is operated to perform an application function that generates application data. An example of an application function is a metering function. In one exemplary embodiment, the user equipment is a stationary meter device for measuring electrical power consumed in a household and includes a wireless communication device. At pre-defined regular intervals, such as once a year, or at pre-defined occasions that do not allow a-priori scheduling, such as a change in the resident of the household, the current reading of the meter device is to be provided to the operator of the user equipment/meter device in order to feed a billing process with the required application data. To this end, the operator of the user equipment further operates one or more application servers AS in an enterprise domain.

At the time the method starts, the user equipment, in performing its application function, is registered with the core network for Non-IP communication services via the wireless cellular radio access network RAN.

The process is initiated by the application server sending to a core-network node a paging instruction in a step S310. In the present embodiment, the core-network node is a SCEF in the IoT core network. The paging instructing is provided using an application program interface protocol, and initiates the SCEF to initiate provision of a paging message via a Non-IP data delivery using, thus in accordance with Non-IP communication, for paging the selected user equipment UE via the wireless cellular radio access network RAN. Compared to the known method of FIG. 1, thus, a completely different mechanism is used to initiate the transfer of application data.

Paging is a technique that is normally used for notifying a user equipment of an incoming voice call or other network-originated traffic. In the present method, paging is used for other purposes and involves other network nodes and the provision of other control information to the user equipment UE. In particular, it is not a mobile switching center (MSC) in the core network as in a known paging process, but the SCEF which is used by the application server AS to initiate the paging to the user equipment UE within the core network. To this end, the SCEF sends a corresponding page instruction to the mobility management entity MME, in a step S320. In a subsequent step S330, the MME forwards the paging along with the IMSI or the MSISDN of the user equipment UE, the latter being originally received by SCEF from the application server AS, as the paging address to be used on the radio interface. The MME thus forwards in this step S330 the paging with all further information, which will be further detailed below, to the base station BS of the RAN where the UE is registered. This RAN may or may not be known by the application server AS, depending on whether the user equipment is stationary or mobile. In any case, it is known by the mobility management entity MME. The base station BS then performs the paging of the user equipment UE in a step S340

As a further deviation from a standard voice-call paging process, the paging instruction provided in accordance with the present embodiment additionally instructs the SCEF to control provision of a particular radio link control RLC message following the paging message. The following information is provided for forwarding to the user equipment in the RLC message that follows the paging message:

- a request for transmission of application data from the user equipment UE to the application server AS using an IP communication service between the user equipment UE, and the application server AS via the wireless cellular radio access network RAN and a dynamic network address of the user equipment to be ascertained by the user equipment; and
- a network address of the application server the application data is to be delivered to, in accordance with the Internet Protocol on the network protocol layer of an IP communication protocol stack to be used for the IP communication service.

Alternatively to containing a request for transmission of application data from the user equipment to the application server AS using an IP communication service between the user equipment the RLC message may only include a request to setup the connection channel to the application server. This is possible in particular if it is known by the device that all paging stipulated context setup is always done in IP form, and thus a control information that implicit in receiving the request to set up the connection channel, and makes it therefore unnecessary to include it explicitly in the request for transmission of application data.

In a more advanced method the message may also contain information related to a shared secret, intended to derive an identity from such a secret to be used for encryption of the communication between device and server.

The provision of the RLC message is not graphically distinguished in FIG. 3 from the paging flow because the nodes used are identical. The RLC message is provided by a base station/eNodeB and based on UE capability information retrieved from MME if necessary. The MME is also the paging entity. The described processes are used in some embodiments with stationary user equipment devices only. In other embodiments, the processes are used with mobile user equipment devices, or with a mix of mobile and stationary user equipment devices. At least the core network knows an MSISDN of the user equipment devices, thus making it possible to address them using the method of the invention, even if they are moving.

Upon reception of the paging message, the user equipment UE does not perform the known service request procedure for voice calls to establish a RRC connection. Instead, it retrieves from the RLC message the request for transmission of the application data from the user equipment to the application server using IP communication services via the wireless cellular network. This step is not illustrated in FIG. 3. Furthermore, the user equipment UE retrieves from the RLC message an IP network address of the application server. The user equipment UE then switches from the non-IP mode to the IP mode by activating use of the IP communication protocol stack. It the requests IP communication services from the core network, in particular from the mobility management entity MME via the wireless cellular network, in a step S350. More specifically, the user equipment UE requests provision of bearer information for uplink IP communication services from the user equipment. This way, it obtains from the mobility management entity MME a dynamic IP address and the bearer information.

Using a bearer indicated by the received bearer information, the IP address of the application server AS as a destination address, and using the dynamic IP address of the user equipment itself as a source address, the user equipment UE then sends the application data to the application server AS via the wireless cellular network RAN and via an assigned core-network serving gateway node SGW, in a step S360.

The application server AS thus receives the requested application data from the user equipment via the wireless cellular radio access network, to complete the asynchronous communication method of the present embodiment.

As will be appreciated from the description of this process, despite the data transmission from the user equipment UE involves the use of a dynamic IP address of the user equipment, the initiation of the data transmission is performed by the application server AS without requiring use of SMS. This way, the application server can exert control of the transmission of the application data on demand also when no SMS capability is provided by the wireless communication network. The process is therefore particularly suited for NB-IoT networks not offering legacy SMS service. It also allows the operator of the application server to act as a service provider, and thus avoids that the MNO operator acts as the service provider.

Also, the user equipment can be operated in cost-saving and energy-saving modes of operation involving a regular non-IP mode and an IP mode using a dynamic IP address only for data transmission, because a paging process is used to initiate the data transmission to the application server. There is no need to maintain a connection to the application server or to periodically establish a connection to the application server in order to check whether a transmission of application data is required. The user equipment UE opens a PDP context with the MME and uses this context later on to transfer the application data.

The user equipment UE for performing the method of FIG. 3 has particular features. Beside comprising an application unit configured to generate application data while performing an application function, the user equipment UE has a particular communication control unit, which is configured to activate use of a Non-IP communication protocol stack that excludes using an Internet Protocol on a network protocol layer for the Non-IP communication services;

to control operation of the user equipment in registering with a core network for only Non-IP communication services via a wireless cellular radio access network;

upon receiving a paging message and a subsequent RLC message in accordance with the Non-IP communication protocol stack, the paging message being initiated by an application server associated with the application function, to retrieve from the RLC message a request for transmission of the application data from the user equipment to the application server using IP communication services via the wireless cellular network; and to retrieve from the RLC message a network address of the application server in accordance with the Internet Protocol on the network protocol layer of an IP communication protocol stack to be used for the IP communication services;

to activate use of the IP communication protocol stack;

to control operation of the user equipment in requesting IP communication services from the core network via the wireless cellular network and obtaining from the core network a dynamic network address of the user equipment that is in accordance with the Internet Protocol on the network protocol layer of the IP communication protocol stack; and to control operation of the user equipment in providing the application data to the application server using the IP communication services via the wireless cellular network and the ascertained dynamic network address of the user equipment and the network address of the application server.

Also, the application server AS requires particular capabilities not known heretofore from application servers. In particular, the application server has a server control unit that is configured to control operation of the server in generating and sending to a core-network node a paging instruction instructing the core-network node to initiate provision of a paging message and a subsequent RLC message in accordance with a Non-IP communication stack that excludes using an Internet Protocol on a network protocol layer for the Non-IP communication services, to a selected user equipment via a wireless cellular radio access network, the paging instruction including,
for forwarding to the user equipment in the RLC
message,
   a request for transmission of application data from the
   user equipment to the application server using an IP
   communication service between the user equipment
   and the application server via the wireless cellular
   radio access network and a dynamic network address
   of the user equipment to be ascertained by the user
   equipment, and
   a network address of the application server in accordance with the Internet Protocol on the network
   protocol layer of an IP communication protocol stack
   to be used for the IP communication service; and
to control operation of the server in receiving, using the
   IP communication services, the requested application
   data from the user equipment via the wireless cellular
   radio access network.

Figure 4:
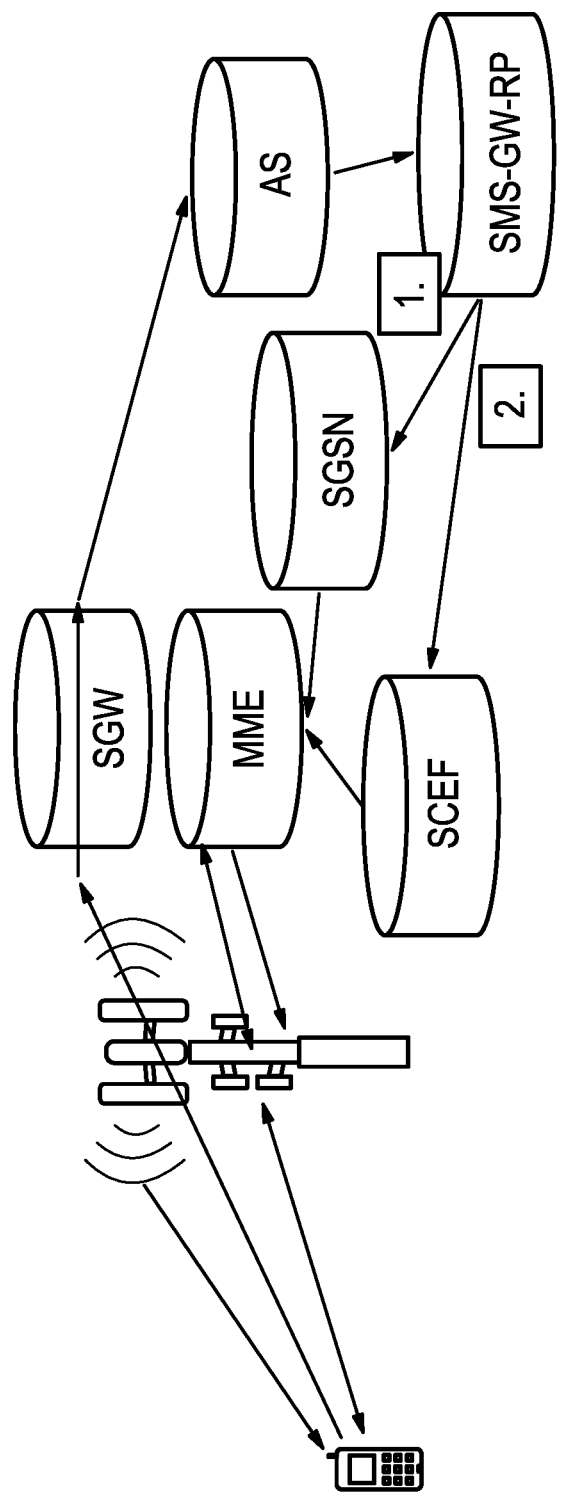
FIG. 4 is an illustration of a second and a third embodiment of a method for a server-initiated provision of application data from a user equipment to an application server via a wireless cellular radio access network according to the present invention.

FIG. 4 is an illustration of a second and a third embodiment of a method for a server-initiated provision of application data from a user equipment to an application server via a wireless cellular radio access network according to the present invention.

The process is largely similar to that described with reference to FIG. 3. The following description will therefore focus on the differences to avoid lengthy repetitions.

The embodiments of FIG. 4 serve to allow an application server use an identical initiation process, irrespective of whether core networks to be used for triggering associated user equipment devices support SMS or not. As shown in FIG. 4, the network structure of the present embodiment is to this end enhanced by an additional network node, which is an SMS gateway-replacer node SMS-GW-RP.

FIG. 4 illustrates two different process embodiments that involve the use of different SMS gateway-replacer nodes with different capabilities. In a first embodiment, the SMS gateway-replacer node is configured, upon receiving the paging SMS message, to generate and provide, using an application program interface protocol, a paging initiation instruction to a core-network service-control-exposure-function, hereinafter SCEF, node. The paging initiation instruction instructs the core-network SCEF node, as described in the context of FIG. 3, to initiate provision of the paging message to the user equipment via a Non-IP data delivery using the Non-IP communication protocol stack via the wireless cellular radio access network. This embodiment allows the application server using as the paging instruction a legacy SMS message, which herein is referred to as a paging SMS message. Thus, instead of communicating directly with the SCEF via an API, the application server uses the paging SMS directed to the SMS gateway-replacer node SMS-GW-RP. Depending on whether a respective user equipment is operated in a legacy network supporting SMS or in a network not supporting SMS, the SMS gateway-replacer node SMS-GW-RP then either forwards the paging SMS to a SGSN or generates and provides a paging instruction to the SCEF, as described in the context of FIG. 3.

The SMS GW-Rp is an additional functionality, transparent to legacy devices and aware of non-IP devices and modifying the request for them accordingly. The SMS gateway-replacer node SMS-GW-RP can be implemented as an integral part of the application server. In other embodiments, it is a separate node. This has the particular advantage that it allows using legacy application servers without modification.

In summary, a user equipment UE registered for Non-IP communication services performs an application function. For providing application data via a radio access network, a method involves receiving a paging message and a subsequent radio link control, RLC, message in accordance with a Non-IP communication protocol. The paging message and the RLC message are initiated by an application server associated with the application function. The UE retrieves a network address of the application server in accordance with an IP communication protocol stack, and activates use of the IP communication protocol stack. The UE then requests IP communication services from the core network via the wireless cellular network, obtains a dynamic network address in accordance with the Internet Protocol and uses its dynamic network address and the network address of the application server to provide the application data to the application server using the IP communication services via the wireless cellular network.

Thus, disclosed is an asynchronous communication method in which a user equipment is registered in the network as non-IP device and uses its non-IP communication capabilities accordingly, except when being non-IP-paged including the destination IP address for delivering its payload. In this case the user equipment establishes in response to said paging directly an IP tunnel to the provided IP address of the server. In a more advanced embodiment the IP address is also known to the user equipment, and the paging includes a challenge response for additional security.

The invention claimed is:

1. A method for operating a user equipment that is registered with a core network for Non-IP communication services via a wireless cellular radio access network in performing an application function and providing application data via the wireless cellular radio access network, the method comprising:
   generating application data while performing an application function;
   receiving a paging message and a subsequent radio link control, RLC, message in accordance with the Non-IP communication protocol stack, the paging message and the RLC message being initiated by an application server associated with the application function;
   retrieving from the RLC message a request for transmission of the application data from the user equipment to the application server using IP communication services via the wireless cellular radio access network;
   retrieving from the RLC message a network address of the application server in accordance with an Internet Protocol on a network protocol layer of an IP communication protocol stack to be used for the IP communication services;
   activating use of an IP communication protocol stack;
   requesting IP communication services from a core network via the wireless cellular network;
   obtaining from the core network a dynamic network address of the user equipment that is in accordance with the Internet Protocol on the network protocol layer of the IP communication protocol stack; and
   using the ascertained dynamic network address of the user equipment and the network address of the application server, providing the application data to the application server using the IP communication services via the wireless cellular network.

2. The method of claim 1, wherein requesting from the network IP communication services via the wireless cellular network comprises:
   using the IP communication protocol stack, opening a connection to a core-network access node responsible for mobility management for the user equipment, and requesting provision of bearer information for uplink IP communication services from the user equipment via the wireless cellular network, and requesting provision of the dynamic network address;

receiving the bearer information and the dynamic network address from the core-network access node via the wireless cellular network.

3. The method of claim 2, wherein providing the application data to the application server comprises:

using a bearer indicated by the bearer information, the network address of the application server as a destination address, and using the dynamic network address of the user equipment as a source address in sending the application data to the application server via the wireless cellular network and via an assigned core-network serving gateway node.

4. The method of claim 1, further comprising:

upon receiving the RLC message following the paging message from the application server, retrieving from the RLC message a challenge according to a challenge-response protocol;

wherein providing the application data to the application server comprises providing a predetermined valid response according to the challenge-response protocol.

5. The method of claim 1, wherein registering with the core network for Non-IP communication services via the wireless cellular radio access network comprises providing to the core network a packet-data-network, hereinafter PDN, connectivity request specifying a PDN type as Non-IP.

6. A method for operating an application server in retrieving application data from a user equipment that is registered with a core network for Non-IP communication services via a wireless cellular radio access network, the method comprising:

sending to a core-network node a paging instruction initiating the core-network node to control provision of a paging message in accordance with a Non-IP communication stack that excludes using an Internet Protocol on a network protocol layer for Non-IP communication services, for paging a selected user equipment via a wireless cellular radio access network, and to control provision of an RLC message following the paging message including, for forwarding to the user equipment in the RLC message following the paging message:

using the IP communication services, receiving requested application data from the user equipment via the wireless cellular radio access network.

7. The method of claim 6, wherein sending the paging message to the user equipment comprises:

providing, using an application program interface protocol, a paging initiation instruction to a core-network service-control-exposure-function, hereinafter SCEF, node, the paging initiation instruction instructing the core-network SCEF node to initiate provision of the paging message to the user equipment via a Non-IP data delivery using the Non-IP communication protocol stack via the wireless cellular radio access network.

8. The method of claim 7, wherein providing the paging initiation instruction to the core-network SCEF node comprises:

ascertaining that the core network does not support short message services, hereinafter SMS;

providing a paging SMS message to a SMS gateway-replacer node, wherein the paging SMS message is an SMS message comprising an instruction for the SMS gateway-replacer node to generate and provide the paging initiation instruction to the SCEF node.

9. The method of claim 6, wherein sending the paging message to the user equipment comprises ascertaining that the core network does not support short message services, hereinafter SMS;

providing a paging SMS message to a SMS gateway-replacer node, wherein the paging SMS message is an SMS message comprising an instruction for the SMS gateway-replacer node to generate and provide a paging initiation request to a core-network serving gateway support, hereinafter SGSN node, the paging initiation request instructing the core-network SGSN node to initiate provision of the paging message to the user equipment via a Non-IP data delivery using the Non-IP communication protocol stack via the wireless cellular radio access network.

10. A user equipment for performing an application function and providing application data via a wireless cellular radio access network, the user equipment configured to:

generate application data while performing an application function;

activate use of a Non-IP communication protocol stack that excludes using an Internet Protocol on a network protocol layer for Non-IP communication services;

control operation of the user equipment in registering with a core network for only Non-IP communication services via the wireless cellular radio access network;

upon receiving a paging message and a subsequent RLC message in accordance with the Non-IP communication protocol stack, the paging message being initiated by an application server associated with the application function;

retrieve from the RLC message a request for transmission of the application data from the user equipment to the application server using IP communication services via the wireless cellular radio access network;

retrieve from the RLC message a network address of the application server in accordance with the Internet Protocol on the network protocol layer of an IP communication protocol stack to be used for the IP communication services;

activate use of the IP communication protocol stack;

control operation of the user equipment in requesting IP communication services from the core network via the wireless cellular radio access network and obtaining from the core network a dynamic network address of the user equipment that is in accordance with the Internet Protocol on the network protocol layer of the IP communication protocol stack; and control operation of the user equipment in providing the application data to the application server using the IP communication services via the wireless cellular radio access network and the ascertained dynamic network address of the user equipment and the network address of the application server.

11. An application server for retrieving application data from a user equipment via a wireless cellular radio access network, the application server configured to:

control operation of the server in generating and sending to a core-network node a paging instruction instructing the core-network node to initiate provision of a paging message and a subsequent RLC message in accordance with a Non-IP communication stack that excludes using an Internet Protocol on a network protocol layer for the Non-IP communication services, to a selected user equipment via a wireless cellular radio access network, the paging instruction comprising, for forwarding to the user equipment in the RLC message:
- a request for transmission of application data from the user equipment to the application server using an IP communication service between the user equipment and the application server via the wireless cellular radio access network and a dynamic network address of the user equipment to be ascertained by the user equipment, and
- a network address of the application server in accordance with the Internet Protocol on the network protocol layer of an IP communication protocol stack to be used for the IP communication service; and control operation of the server in receiving, using the IP communication services, the requested application data from the user equipment via the wireless cellular radio access network.

12. A system for generating and retrieving application data from a user equipment via a wireless cellular radio access network, the system comprising:
a user equipment configured to:
  generate application data while performing an application function;
    activate use of a Non-IP communication protocol stack that excludes using an Internet Protocol on a network protocol layer for Non-IP communication services;
    control operation of the user equipment in registering with a core network for only Non-IP communication services via the wireless cellular radio access network;
    upon receiving a paging message and a subsequent RLC message in accordance with the Non-IP communication protocol stack, the paging message being initiated by an application server associated with the application function,
    retrieve from the RLC message a request for transmission of the application data from the user equipment to the application server using IP communication services via the wireless cellular radio access network;
    retrieve from the RLC message a network address of the application server in accordance with the Internet Protocol on the network protocol layer of an IP communication protocol stack to be used for the IP communication services;
    activate use of the IP communication protocol stack;
    control operation of the user equipment in requesting IP communication services from the core network via the wireless cellular radio access network and obtaining from the core network a dynamic network address of the user equipment that is in accordance with the Internet Protocol on the network protocol layer of the IP communication protocol stack; and
    control operation of the user equipment in providing the application data to the application server using the IP communication services via the wireless cellular radio access network and the ascertained dynamic network address of the user equipment and the network address of the application server; and an application server configured to:
  control operation of the server in generating and sending to a core-network node a paging instruction instructing the core-network node to initiate provision of a paging message and a subsequent RLC message in accordance with a Non-IP communication stack that excludes using an Internet Protocol on a network protocol layer for the Non-IP communication services, to a selected user equipment via a wireless cellular radio access network, the paging instruction comprising, for forwarding to the user equipment in the RLC message:
    a request for transmission of application data from the user equipment to the application server using an IP communication service between the user equipment and the application server via the wireless cellular radio access network and a dynamic network address of the user equipment to be ascertained by the user equipment, and
    a network address of the application server in accordance with the Internet Protocol on the network protocol layer of an IP communication protocol stack to be used for the IP communication service; and
  control operation of the server in receiving, using the IP communication services, the requested application data from the user equipment via the wireless cellular radio access network.

13. The system of claim 12, further comprising:
an SMS gateway-replacer node; wherein
the application server is configured to:
  ascertain that the core network does not support short message services, hereinafter SMS; and
  provide a paging SMS message to the SMS gateway-replacer node; and wherein
the SMS gateway-replacer node is configured, upon receiving the paging SMS message,
  generate and provide, using an application program interface protocol, a paging initiation instruction to a core-network service-control-exposure-function, hereinafter SCEF, node, the paging initiation instruction instructing the core-network SCEF node to initiate provision of the paging message to the user equipment via a Non-IP data delivery using the Non-IP communication protocol stack via the wireless cellular radio access network.

14. The system of claim 12, further comprising:
an SMS gateway-replacer node; wherein
the application server is configured to:
  ascertain that the core network does not support short message services, hereinafter SMS; and
  provide a paging SMS message to the SMS gateway-replacer node; and wherein
the SMS gateway-replacer node is configured, upon receiving the paging SMS message,
  generate and provide a paging initiation request to a core-network serving gateway support, hereinafter SGSN node, the paging initiation request instructing the core-network SGSN node to initiate provision of the paging message to the user equipment via a Non-IP data delivery using the Non-IP communication protocol stack via the wireless cellular radio access network.

* * * * *